US012235611B2

(12) United States Patent
Bonke

(10) Patent No.: US 12,235,611 B2
(45) Date of Patent: Feb. 25, 2025

(54) WATCH GLASS WITH A DECORATIVE ELEMENT

(71) Applicant: Realization Desal AG, Oberwil bei Zug (CH)

(72) Inventor: Michael Bonke, Oberwil bei Zug (CH)

(73) Assignee: REALIZATION DESAL AG, Oberwil (CH)

( * ) Notice: Subject to any disclaimer, the term of this patent is extended or adjusted under 35 U.S.C. 154(b) by 525 days.

(21) Appl. No.: 17/631,202

(22) PCT Filed: Apr. 29, 2021

(86) PCT No.: PCT/EP2021/061339
§ 371 (c)(1),
(2) Date: Jan. 28, 2022

(87) PCT Pub. No.: WO2021/224116
PCT Pub. Date: Nov. 11, 2021

(65) Prior Publication Data

US 2022/0276612 A1 Sep. 1, 2022

(30) Foreign Application Priority Data

May 8, 2020 (DE) .................... 10 2020 112 523.2

(51) Int. Cl.
*G04B 39/00* (2006.01)
*A44C 17/02* (2006.01)
(Continued)

(52) U.S. Cl.
CPC ........ *G04B 39/002* (2013.01); *A44C 17/0258* (2013.01); *G04B 47/042* (2013.01); *G04B 19/12* (2013.01)

(58) Field of Classification Search
CPC .... G04B 39/002; G04B 47/042; G04B 19/12; G04B 39/00; A44C 17/0258; A44C 17/02
See application file for complete search history.

(56) References Cited

U.S. PATENT DOCUMENTS 4,473,306 A 9/1984 Lederrey
8,411,533 B2 * 4/2013 Mieville ............... G04B 21/08
368/244

(Continued)

FOREIGN PATENT DOCUMENTS

DE 8611077 U1 6/1986
DE 102015207049 A1 10/2016

(Continued)

OTHER PUBLICATIONS

International Search Report from International Application No. PCT/EP2021/061339, mailed on Aug. 10, 2021, 4 pages.

(Continued)

*Primary Examiner* — Edwin A. Leon
(74) *Attorney, Agent, or Firm* — Tucker Ellis LLP

(57) ABSTRACT

A watch glass includes a first glass, second glass and a decorative element, in particular a gemstone. Here, the first glass and the second glass are connected to one another via a connecting intermediate layer. The first glass includes a continuous recess. The decorative element includes a base region, which is arranged settingless in the recess of the first glass and in direct contact with the connecting intermediate layer. Further, a watch can include such a watch glass.

14 Claims, 6 Drawing Sheets

Figure 1:
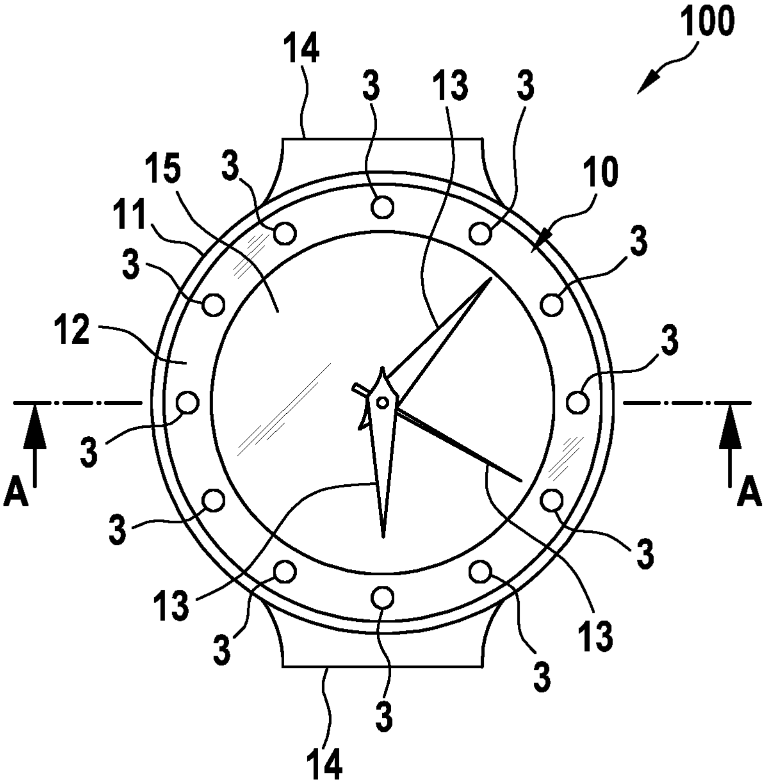

(51) Int. Cl.
*G04B 19/12* (2006.01)
*G04B 47/04* (2006.01)

(56) References Cited

U.S. PATENT DOCUMENTS

| | | | | |
|---|---|---|---|---|
| 9,820,538 | B2 * | 11/2017 | Lebreton | A44C 17/04 |
| 9,952,559 | B2 * | 4/2018 | Dolce | G04B 47/042 |
| 10,067,476 | B2 * | 9/2018 | Bonke | H01R 13/6275 |

FOREIGN PATENT DOCUMENTS

| | | | |
|---|---|---|---|
| EP | 0098240 | A1 | 1/1984 |
| WO | 2018091309 | A1 | 5/2018 |
| WO | 2018141428 | A1 | 8/2018 |

OTHER PUBLICATIONS

Office Action from corresponding German Application No. 10 2020 112 523.2 mailed on Mar. 2, 2021, 4 pages.

* cited by examiner

WATCH GLASS WITH A DECORATIVE ELEMENT

RELATED APPLICATION DATA

This application is a National Phase Application of International Application No. PCT/EP2021/061339 filed Apr. 29, 2021, which claims benefit of German Application No. DE 10 2020 112 523.2 filed May 8, 2020, the entireties of which are incorporated by reference herein.

The invention relates to a watch glass with a decorative element as well as a watch with such a watch glass.

Watch glasses with decorative elements are well known. In particular, the prior art knows a wide variety of solutions for arranging decorative elements on the watch glass. For example, it is a common method to attach decorative elements to the watch glass by means of a setting.

It is an object of the present invention to provide a watch glass with a decorative element, wherein the decorative element is securely attached to the watch glass and appears to float.

The solution to this object is achieved by a watch glass, which comprises a first glass, a second glass and a decorative element, in particular a gemstone. Here, the first glass and the second glass are connected to one another via a connecting intermediate layer. The first glass has a continuous recess and the decorative element has a base region. The base region is arranged settingless in the continuous recess of the first glass and is in direct contact with the connecting intermediate layer. In other words, no setting is provided in the watch glass by which the decorative element or rather its base region is held in the recess of the first glass.

The settingless arrangement of the decorative element gives the watch glass a special appearance, since the decorative element comes to the foreground from an optical point of view and preferably even seems to float in or on the watch glass.

In particular, if the first glass is not covered by another glass, the decorative element is due to the continuous design of the recess of the first glass visible directly and not through a glass. Thus, the decorative element, in particular a gemstone, appears realistic, since part of the light which hits the first glass is radiated directly onto the decorative element and is not weakened by a glass covering the decorative element.

By providing a first and a second glass, which are connected to one another via the connecting intermediate layer, a robust watch glass is created. In particular, the watch glass is thus designed to be break-proof as a unit, since micro-cracks, which can potentially arise from the shaping of the recess, end at the connecting intermediate layer and are therefore not transferred to the second glass. This is particularly advantageous if the first glass has two or more, for example twelve, continuous recesses with corresponding decorative elements. The more recesses there are provided in a glass, the smaller the distance between the recesses is and the more likely it is that micro-cracks in adjacent recesses will continue and be connected to one another due to mechanical loading of the glass, what can ultimately lead to a breakthrough of the glass. By the present connection, however, a mechanical loading of the first glass can be reduced in the case of an impact of the decorative elements, since the impact energy is also distributed to and absorbed by the second glass via the connecting intermediate layer. This prevents a connection between neighboring micro-cracks, which could otherwise cause the glass to break through.

Furthermore, potential surface deviations of the glasses can be compensated for by the connecting intermediate layer, what results in a very strong connection between the glasses.

In particular, the base region of the decorative element is due to the abandonment of a setting in direct contact only with the connecting intermediate layer or only with the connecting intermediate layer and air.

As a setting, a metal setting, for example a gold setting, is in particular understood within the context of the present invention.

The first glass is advantageously arranged on the second glass.

The first glass and the second glass are preferably each designed as a glass plate. Here, the first glass and the second glass are preferably connected flatly to one another via the connecting intermediate layer.

According to an exemplary embodiment, the second glass does preferably not have a recess that is continuous and in particular aligned with the recess of the first glass. The second glass is particularly preferably continuously formed, i.e. the second glass has no recess. In the latter case, one or more continuous recesses is/are only provided in the first glass. In this way, watertightness of the watch glass and thus also of a watch comprising the watch glass can be guaranteed.

According to an alternative exemplary embodiment, the second glass preferably has a recess which, in particular, is continuously formed. Here, the continuous recess of the first glass (first recess) and the recess of the second glass (second recess) form a watch glass recess.

In particular, the first glass is made from sapphire glass.

The connecting intermediate layer is arranged in particular between the first glass and the second glass, in particular between opposite surfaces of the glasses.

Within the context of the invention, the surface of the first glass facing the second glass can in particular also be referred to as lower surface of the first glass. Accordingly, within the scope of the invention, the surface of the second glass facing the first glass can in particular also be referred to as upper surface of the second glass.

Within the context of the present invention, in particular the glass that the light first hits when the watch glass is arranged in a watch is referred to as first glass.

Via the connecting intermediate layer, the first glass and the second glass are materially connected to one another.

The connecting intermediate layer can preferably be formed from an organic or inorganic joining or adhesive material or adhesive layer or an elastic film (also: composite film, in particular adhesive film). In particular, the connecting intermediate layer can be formed from cast resin. The cast resin can for example be a two-component epoxy resin or a UV-curable one-component adhesive.

Preferably, a thickness of the connecting intermediate layer at the location of the decorative element in the thickness direction of the glasses is between 5% and 12%, in particular between 7% and 10%, of a thickness of the watch glass (i.e., the thickness of the arrangement of the first glass, the second glass and the connecting intermediate layer).

Preferably, the thickness of the connecting intermediate layer at the location of the decorative element in the thickness direction of the glasses is between 12% and 22%, in particular between 14% and 20%, of a thickness of the first glass and/or a thickness of the second glass.

Preferably, the connecting intermediate layer has the same thickness at every point between the first glass and the second glass and/or at every point between the first glass and a jacket surface of the decorative element.

The connecting intermediate layer is advantageously transparent.

Further preferably, the connecting intermediate layer has a refractive index, which is equal to, or essentially equal to the refractive index of the first glass and/or of the second glass. Within the context of the invention, "essentially equal" means in particular that the refractive indices of the connecting intermediate layer and of the first glass and/or of the second glass differ from one another by a maximum of 20%. Here, it is advantageous if the refractive index of the first glass is greater than the refractive index of the connecting intermediate layer. In particular, the refractive index of the connecting intermediate layer is 1.4 to 1.6, in particular 1.48.

For example, the connecting intermediate layer can be formed from an EVA laminating film (ethylene-vinyl acetate copolymer laminating film).

The decorative element is preferably a gemstone, in particular a precious stone or semi-precious stone, particularly preferably a diamond. In particular, the gemstone can be natural or synthetic.

Within the scope of the invention, a cut stone, in particular with optical properties, such as transparency is to be understood as a gemstone. The gemstone can in particular be faceted.

Furthermore, within the scope of the invention, a precious stone is understood in particular as a gemstone that meets the following four criteria:

1. rarity
2. Mohs hardness (precious stone hardness) greater than or equal to 5, preferably greater than or equal to 6, particularly preferably greater than or equal to 7
3. transparency
4. refractive index greater than or equal to 1.56, preferably greater than or equal to 1.7

In particular, diamonds, rubies, sapphires, and emeralds are precious stones. In particular, diamond has a Mohs hardness of 10 and a sapphire a Mohs hardness of 9. Furthermore, a diamond has a refractive index of 2.4.

Particularly preferably, the decorative element is a gemstone or rather a precious stone with a Mohs hardness of at least 8, preferably at least 9, and/or a refractive index of at least 1.7.

In the present invention, a glass part is, because of its chemical composition and structure, in particular not understood as a gemstone (semi-precious stone, precious stone or other gemstone), even if the glass part consists of a material (starting material) which is classified as a gemstone (semi-precious stone, precious stone or other gemstone) in its raw state. The glass part can, for example, be a quartz glass, wherein the quartz glass does not count among the gemstones, even if quartz (starting material) is a gemstone.

According to an alternative advantageous embodiment of the watch glass, the decorative element can be a metal insert, for example a gold insert.

If the watch glass has a plurality of decorative elements, any combination of semi-precious stones, precious stones, other gemstones and metal inlays is possible.

The base region preferably has an end face. Here, the end face of the base region is preferably at least partially, in particular completely, in direct contact with the connecting intermediate layer.

In particular, only the end face of the base region may be in direct contact with the connecting intermediate layer.

The end face of the base region is in particular the face of the decorative element that faces the second glass and is in particular perpendicular to a thickness direction of the glasses. The thickness direction of the glasses is a direction perpendicular to the glasses.

As an alternative or in addition to the end face, a circumferential surface of the base region can at least partially, in particular completely, be in direct contact with the connecting intermediate layer. A partial contact of the circumferential surface with the connecting intermediate layer means within the context of the invention in particular that the circumferential surface of the base region does not contact the connecting intermediate layer over its entire length and/or not completely circumferentially, i.e. not over 360 degrees. On the other hand, a complete contact between the circumferential surface of the base region and the connecting intermediate layer means that the circumferential surface of the base region is in contact with the connecting intermediate layer over its entire length and over 360 degrees.

It should also be noted that, within the scope of the invention, the connecting intermediate layer in particular comprises both connecting material, which is located between the opposite surfaces of the first glass and the second glass, and connecting material, which is located between the circumferential surface of the base region of the decorative element and the first glass.

That way, the base region or the end face of the base region can be referred to within the scope of the invention as "embedded in the connecting intermediate layer", if both the end face and at least part of the circumferential surface of the base region are in direct contact with the connecting intermediate layer.

According to one exemplary embodiment, the base region of the decorative element is advantageously completely arranged in the recess of the first glass.

In particular, the base region of the decorative element is arranged only in the recess of the first glass.

Preferably, the base region, in particular the end face, of the decorative element is arranged flush with a surface (lower surface) of the first glass facing the second glass. Alternatively, the base region of the decorative element may end in the recess of the first glass. In the latter case, this means in particular that an end region, in particular the end face, of the base region is spaced apart from a surface of the first glass facing the second glass in the thickness direction of the glasses. Since the base region does not protrude into the second glass, the base area can remain partially or completely invisible from the side. This is possible because at least a part of the light that hits the first glass and is refracted at the surface of the first glass, misses the base region and can pass below the end region, in particular the end face, of the base region through the second glass due to the already described arrangement of the decorative element. Thus, a housing of a watch can also be made compact or more space can be available in the housing for the clockwork, the hands and the dial, since the decorative element does not protrude beyond the second glass.

Preferably, the base region of the decorative element is formed in the shape of a pin. In particular, the base region is formed in the shape of a cylinder.

Preferably, the base region of the decorative element has a recess, in particular a circumferential recess, in particular in a circumferential surface of the base region. The circumferential surface of the base region can within the context of the invention also be referred to as a jacket surface.

In particular, the recess is formed completely circumferential, i.e. over 360 degrees.

The recess preferably has a depth in a direction perpendicular to the thickness direction of the glasses of at least 0.1 mm, preferably of at least 0.2 mm, particularly preferably of at least 0.3 mm. In particular, the recess has a constant depth.

Particularly preferably, the recess is formed ring-shaped.

The decorative element can in particular only comprise the base region.

Alternatively, the decorative element can preferably have an additional region that protrudes beyond the first glass. The visual impression of the watch glass can thus be marked by the additional region of the decorative element.

The decorative element is advantageously formed in one piece.

In particular, the additional region can protrude beyond the first glass in the thickness direction of the glasses and/or in a direction perpendicular to the thickness direction, in particular in any direction perpendicular to the thickness direction. In other words, the additional region is advantageously arranged above the first glass or rather an upper surface of the first glass. The wording "in every direction perpendicular to the thickness direction" means in particular that the additional region protrudes completely circumferentially, i.e. over 360 degrees, beyond the recess of the first glass.

Thus, the base region can be optically covered by the additional region, whereby the impression that the decorative element is formed only from the additional region is conveyed. At the same time, however, the base region ensures via the base region a strong attachment of the decorative element to the first glass.

In particular in comparison to a decorative element, which is arranged on a glass exclusively via its lower surface and is glued to it, the decorative element according to the present invention as well as its described arrangement is advantageous, as, in the case of a potential impact of the additional region, the decorative element is fixed via its base region in the recess of the first glass and the impact energy is also distributed to the second glass via the connecting intermediate layer. In contrast, the connection of a decorative element connected only to the upper surface of the glass can be undone relatively easily due to a mechanical loading of the decorative element and/or over time.

Preferably, the additional region is arranged on the first glass or rather on an upper surface of the first glass. This means that a lower surface of the additional region, which faces the first glass, lies on the upper surface of the first glass.

Between the lower surface of the additional region and an upper surface of the first glass, there is preferably no material connection. However, it is also possible that the opposite surfaces of the additional region and of the first glass are connected to one another in a materially bonded manner.

Preferably, a cross-sectional area of the additional region of the decorative element is larger than a cross-sectional area of the recess on the plane of the upper surface of the first glass. In particular, a part of the additional region, in particular the entire additional region, has a cross-sectional area which is larger than the cross-sectional area of the recess of the first glass on the plane of the upper surface of the first glass. The cross-sectional area of the additional region and/or the recess of the first glass is/are in particular perpendicular to the thickness direction of the glasses.

Preferably, a ratio of a length of the base region of the decorative element in the thickness direction of the glasses to a length of an overhang of the additional region in a direction perpendicular to the thickness direction, in particular to each direction perpendicular to the thickness direction, is selected such that light that is reflectable from the base region is totally reflected at an inner surface of the first glass and/or at least a part of the light that enters the first glass does not reach the base region.

In other words, this ratio can preferably be selected such that at least a part of the light, in particular all of the light that passes through the first glass and hits the base region of the decorative element, is reflected at an angle greater than the total reflection angle of the first glass. This light is thus totally reflected at the inner surface of the upper surface of the first glass and cannot exit the first glass. In other words, this light is due to the total reflection at the inner surface of the upper surface of the first glass reflected back into the first glass. Since this light cannot reach the eye of a viewer, the base region disappears optically.

Alternatively or in addition, this ratio can preferably be selected in such a way that a part of the light, which passes through the first glass, does not reach the base region. Due to the refraction of the light, which passes through the first glass, the ratio is selected such that the light is refracted in such a way that it no longer hits the base region. Thus, the base region is not visible.

In particular, this ratio can be selected in such a way that none of the light that enters the first glass reaches the base region.

Particularly preferably, the ratio of the length of the base region of the decorative element in the thickness direction of the glasses to a length of an overhang of the additional region in a direction perpendicular to the thickness direction is a maximum "2 to 1". With such a ratio, the base region is not visible and the stability of the decorative element is also ensured.

Preferably, the first glass preferably has a greater refractive index than the second glass.

Preferably, the first glass has a refractive index greater than or equal to 1.6, in particular greater than or equal to 1.7. Thus, at least a part of the light, in particular all of the light, which obliquely hits the first glass, can be refracted at the surface of the first glass in such a way that this light does not reach the base region of the decorative element. Thus, the refractive index of the first glass can also contribute to the fact that the base region is only slightly, at best not at all, visible to an observer.

According to a preferred embodiment of the invention, the recess of the first glass has the same cross section over its entire length. Thus, the recess of the first glass can be easily produced. For example, the recess of the first glass can be formed in the shape of a cylinder. The term "cross section" means both a cross-sectional area and a cross-sectional shape. These design options can preferably also be used in the recess of the second glass. The length of the respective recess is the dimension of the recess in the thickness direction of the glasses.

According to an alternative preferred embodiment of the invention, the recess of the first glass has a first recess region with a first cross-sectional area and a second recess region with a second cross-sectional area. The second recess region is arranged closer to the second glass than the first recess region. In particular, the second cross-sectional area is larger than the first cross-sectional area. Furthermore, a space of the second recess region between the first glass and the base region of the decorative element is advantageously filled with connecting material of the connecting intermediate layer. Thus, a particularly strong connection of the base region of the decorative element to the first glass is enabled. Preferably, the first recess area and the second recess area have the same cross-sectional shapes. For example, the first and the second recess area can each have a circular cross section.

Preferably, the recess of the base region of the decorative element is arranged opposite the second recess region and is connected via the connecting intermediate layer to the second recess region. Here, a space of the second recess region between the first glass and the base region of the decorative element, including the recess, is advantageously filled with connecting material of the connecting intermediate layer. Due to the provision of the second recess region with the second cross-sectional area and the recess of the decorative element, there exists a large amount of the connecting material for fixing the base region of the decorative element in the watch glass.

In particular, a clear distance between the base region of the decorative element and the recess of the first glass is between 0.1 mm (inclusive) and 0.6 mm (inclusive), in particular between 0.2 mm (inclusive) and 0.5 mm (inclusive)).

As already described, the second glass may preferably also have a recess, which, together with the continuous recess of the first glass, forms the watch glass recess. The recess of the second glass is preferably formed continuously.

It is here advantageous, if the base region of the decorative element is at least partially, in particular completely, arranged in the watch glass recess. This means that it is advantageous if a base region is positioned at least partially, in particular completely, both in the first recess and in the second recess.

Preferably, a space of the watch glass recess, which is defined by the first glass, the second glass and the base region, is filled with connecting material of the connecting intermediate layer, so that the decorative element is connected via the connecting material to the first glass and the second glass.

It results therefrom that the connecting intermediate layer advantageously comprises both connecting material, which is located between opposite surfaces of the glasses, and connecting material, which is located in the space of the watch glass recess between the first glass, the second glass and the base region of the decorative element. In other words, the connecting material between the opposite surfaces of the glasses and the connecting material in the already described space are to be understood in an advantageous manner as a uniform/continuous connecting intermediate layer that serves to connect as well the first glass to the second glass as the decorative element to the glasses.

Furthermore, the formulation that the space of the watch glass recess between the first glass and the second glass is filled with connecting material of the connecting intermediate layer advantageously means that the space is completely filled.

Such an arrangement is particularly advantageous because, in the case of a potential impact of the additional region of the decorative element, the decorative element is fixed via its base region, which is at least partially arranged in the watch glass recess, wherein the impact energy is distributed to both glasses via the connecting intermediate layer.

Preferably, a maximum thickness of the connecting intermediate layer between the first glass and the second glass in the thickness direction of the glasses is smaller than a maximum thickness of the connecting material of the connecting intermediate layer in the space between the first glass, the second glass and the decorative element in the thickness direction of the glasses.

Preferably, a maximum thickness of the connecting intermediate layer between the first glass and the second glass in the thickness direction of the glasses is smaller than a maximum thickness of the connecting material of the connecting intermediate layer in the space between the first glass, the second glass and the decorative element in a direction perpendicular to the thickness direction of the glasses.

Preferably, the connecting material in the space between the first glass, the second glass and the decorative element has a maximum thickness in the thickness direction of the glasses and/or in a direction perpendicular to the thickness direction of the glasses of at least 2 mm, preferably at least 3 mm, further preferably at least 4 mm, particularly preferably at least 5 mm.

In particular, a region of the decorative element can directly contact the first glass and/or the second glass.

Preferably, the decorative element has a base region and an additional region.

The base region preferably has a first sub-region and a second sub-region. Here, the space of the watch glass recess between the first glass, the second glass, the first sub-region and the second sub-region is advantageously filled with connecting material of the connecting intermediate layer.

Further preferably, the first sub-region of the base region can be inclined to an axis perpendicular to the glasses. Accordingly, the second sub-region of the base region may preferably be inclined to an axis perpendicular to the glasses.

"Inclined" with reference to the first sub-region and the second sub-region advantageously means that the first sub-region or the second sub-region do not extend parallel to an axis perpendicular to the glasses.

The axis perpendicular to the glasses is in particular parallel to the thickness direction of the glasses.

Particularly preferably, the first sub-region and/or the second sub-region is/are conically shaped.

The first sub-region and the second sub-region advantageously define an intermediate space, which coincides in the assembled state of the decorative element in the watch glass partially or completely with the space of the watch glass recess between the first glass, the second glass and the decorative element. This means that this intermediate space is filled with connecting material of the connecting intermediate layer in the arranged state of the decorative element in the watch glass recess.

Preferably, the second sub-region has a greater inclination than the first sub-region. In other words, the second sub-region is preferably more inclined to the axis perpendicular to the glasses than the first sub-region.

Preferably, an angle between the first sub-region and the second sub-region is less than 90 degrees, preferably between 10 degrees and 50 degrees, particularly preferably between 20 degrees and 40 degrees.

In an advantageous manner, the connecting material of the connecting intermediate layer in the space between the first glass, the second glass and the base region of the decorative element has a triangular cross-section in a section perpendicular to the glasses. The section plane is defined in particular by the thickness direction of the glasses and the direction perpendicular to the thickness direction.

In particular, the first sub-region of the base region faces away from the interior of the housing of the watch, when the decorative element is arranged in the watch glass recess. Here, the second sub-region faces in particular the interior of the housing.

Preferably, the second sub-region protrudes beyond a lower surface of the second glass, in particular by a maximum of 20%, preferably a maximum of 10%, particularly preferably a maximum of 5%, of a thickness of the watch glass. Here, the thickness of the watch glass corresponds in particular to the sum of the thicknesses of the first glass, the second glass and the connecting intermediate layer in the region between the first glass and the second glass.

According to an alternative embodiment of the invention, the second sub-region does not protrude beyond the lower surface of the second glass.

In particular, the second sub-region may end in the watch glass recess, in particular in the recess of the second glass. Alternatively, an end region of the second sub-region can be flush with the lower surface of the second glass. Here, the "end region" is to be understood in particular as the part of the second sub-region that has the greatest distance in the thickness direction of the glasses from the upper surface of the first glass.

Thus, the base region can be arranged according to a design completely in the watch glass recess or can partially be arranged according to a further design in the watch glass recess and partially protrude beyond the lower surface of the second glass.

Preferably, the first recess has a first recess region and a second recess region. The first and the second recess region of the first recess advantageously have different shapes.

Accordingly, the second recess can preferably have a first recess region and a second recess region. The first and second recess regions of the second recess advantageously have different shapes.

Advantageously, the first recess region of the first recess has a first cross-sectional area and the second recess region of the first recess a second cross-sectional area. In particular, the first cross-sectional area is here larger than the second cross-sectional area. Furthermore, the first recess region of the first recess preferably faces away from the second glass, wherein the second recess region faces the second glass.

Accordingly, the first recess region of the second recess can advantageously have a first cross-sectional area and the second recess region of the second recess a second cross-sectional area. In particular, the first cross-sectional area is here larger than the second cross-sectional area. Furthermore, the first recess region of the second recess preferably faces the first glass, wherein the second recess region faces away from the first glass.

Preferably, the first recess region of the first recess can be conically shaped. The second recess region of the first recess can preferably be formed in the shape of a cylinder.

Accordingly, the first recess region of the second recess can preferably be conically shaped. The second recess region of the second recess can preferably be formed in the shape of a cylinder.

However, it is also possible that the first recess region of the first recess and/or the second recess region of the first recess and/or the first recess region of the second recess and/or the second recess area of the second recess are formed in the shape of a cylinder, with the same or different diameters.

Preferably, the first sub-region of the base region can contact the first glass, in particular the first recess region and/or the second recess region of the first recess. Accordingly, the second sub-region of the base region can preferably contact the second glass, in particular the first recess region and/or the second recess region of the second recess.

Preferably, the first sub-area can be materially connected, in particular glued, to the first glass and/or the second glass via their contact surfaces.

In particular, such a material connection can be provided between the first sub-region and the first recess region of the first recess and/or between the second sub-region and the second recess region of the second recess.

In particular, the decorative element may be materially connected, in particular glued, only to the first glass at their contact point. In particular, such a connection can be provided only between the first sub-region and the first, in particular conical, recess region of the first recess.

The described material connection, in particular adhesion, between the decorative element and the first glass at their contact surfaces has the advantage that a contact of the connecting intermediate layer with the ambient air is prevented in the finished watch glass, whereby air humidity cannot reach the connecting intermediate layer. Thus, the adherence property of the connecting intermediate layer is ensured in the finished watch glass, even if the connecting intermediate layer is made from a hygroscopic material. Furthermore, it can thereby be avoided that material of a starting intermediate layer escapes from the watch glass recess during connecting of the first glass to the second glass. In addition, the described material connection has the advantage that the decorative element remains motionless in the watch glass recess during the connecting of the first glass to the second glass. Thus, a desired positioning of the decorative element in the finished watch glass can be precisely achieved. Moreover, a particularly strong connection of the decorative element to the watch glass is ensured.

In an advantageous manner, a material, in particular an adhesive material, which remains stable between 110 degrees Celsius and 150 degrees Celsius, in particular between 130 degrees Celsius to 145 degrees Celsius, is water-insensitive and does not react with the material of the starting intermediate layer is used as material for the previously described material connection.

For example, a two-part epoxy resin or a waterproof UV adhesive can be used.

According to an alternative embodiment of the invention, a sealing element can preferably be provided instead of an adhesion at the contact point between the first glass and the decorative element, in particular between the first glass or rather the first recess region of the first recess and the first sub-region of the base region.

Correspondingly, according to an alternative embodiment of the invention, a sealing element can preferably be provided instead of an adhesion at the contact point between the second glass and the decorative element, in particular between the second glass or the first recess region of the first recess and the second recess region.

It should be noted that, with regard to the disclosure of the present invention, the previously described features of the watch glass, in particular of the first glass, the second glass, the connecting intermediate layer and the decorative element, may arbitrarily be combined with one another, as long as they are not mutually exclusive.

Further, the present invention also relates to a watch, which comprises a previously described watch glass. In particular, the watch has a housing, on which the watch glass is arranged. Preferably, the watch glass is mounted in the housing and glued to it. The watch glass is arranged on the housing in such a way that the first glass faces away from an interior of the housing. In other words, the first glass is the outer glass in the watch.

The watch is preferably a wristwatch.

For manufacturing the previously described watch glass, a method is proposed that comprises the following steps:

providing the first glass and the second glass, forming the recess in the first glass, providing the decorative element, in particular the gemstone, arranging the decorative element in the recess, and connecting the first glass to the second glass via the connecting intermediate layer; especially after the arrangement of the decorative element in the recess.

For providing a decorative element formed as a gemstone, a rough stone can be cut so that the base region and/or the additional region are shaped.

The recess may preferably be formed in the first glass by means of laser drilling or mechanical drilling.

The upper surface and/or lower surface of the first glass is/are preferably ground after the formation of the recess. Thus, potential disruptions that may be arise in the recess due to the formation of the recess can be removed.

Connecting the first glass to the second glass via the connecting intermediate layer preferably comprises heating the arrangement of the first glass, the second glass and a starting intermediate layer arranged between them at a temperature between 110 degrees Celsius and 150 degrees Celsius, in particular between 130 degrees Celsius to 145 degrees Celsius.

The starting intermediate layer can preferably be an organic or inorganic joining or adhesive material or adhesive layer or an elastic film (also: composite film, in particular adhesive film). In particular, the starting intermediate layer can be formed from cast resin. The cast resin can for example be a two-component epoxy resin or a UV-curable one-component adhesive.

Furthermore, connecting the first glass to the second glass can preferably take place under vacuum to remove air from the space between the glasses, and by exertion of pressure, in particular of 1 bar, on the arrangement of the glasses in order to achieve a strong connection of the glasses to each other.

Thus, an airtight connection point is achieved between the first glass and the second glass as well as between the first glass and the base region of the decorative element. Due to the lack of voids or air bubbles between the decorative element and the connecting intermediate layer, a vacuum effect occurs, by which the decorative element is pressed into the recess by the air pressure exerted on it. In the case of mechanical loading of the decorative element, by which the decorative element would begin to wobble in the recess, the vacuum draws in the base region of the decorative element. The base region is therefore not only held by the effect of the connecting intermediate layer, but also by the described vacuum effect.

The starting intermediate layer can be a liquid adhesive, which then hardens for connecting the glasses to one another as well as the decorative element to the first glass.

For providing the finished watch glass, material of the starting intermediate layer, which has potentially flowed out of the space between the glasses after the joining process between the first glass and the second glass, is removed in an advantageous manner.

The present invention enables due to its simple implementation and universal applicability a multitude of designs. In this way, e.g. faceted gemstones, gemstones in all cuts such as cabochon gemstones, metal indexes, relief-like stamped numerals, pictorial representations such as twelve zodiac signs, pearls, etc. can easily be attached to the watch glass. The puristic representation that only an upper surface of the base region or only the additional region of the decorative element and no other material except for the watch glass is visible, enables a purity in the style and the impression of the decorative element and the watch glass. In this way, a watch with a white mother-of-pearl dial and twelve small, white, applied half-pearls is not disturbed by anything in its mother-of-pearl effect. Furthermore, a water-tight watch glass as well as a strong connection of the decorative element to the watch glass can be ensured by the present invention.

Further details, advantages and features of the present invention result from the following description of exemplary embodiments with reference to the drawing, in which identical, or functionally identical, elements are each provided with the same reference signs.

Figure 2:
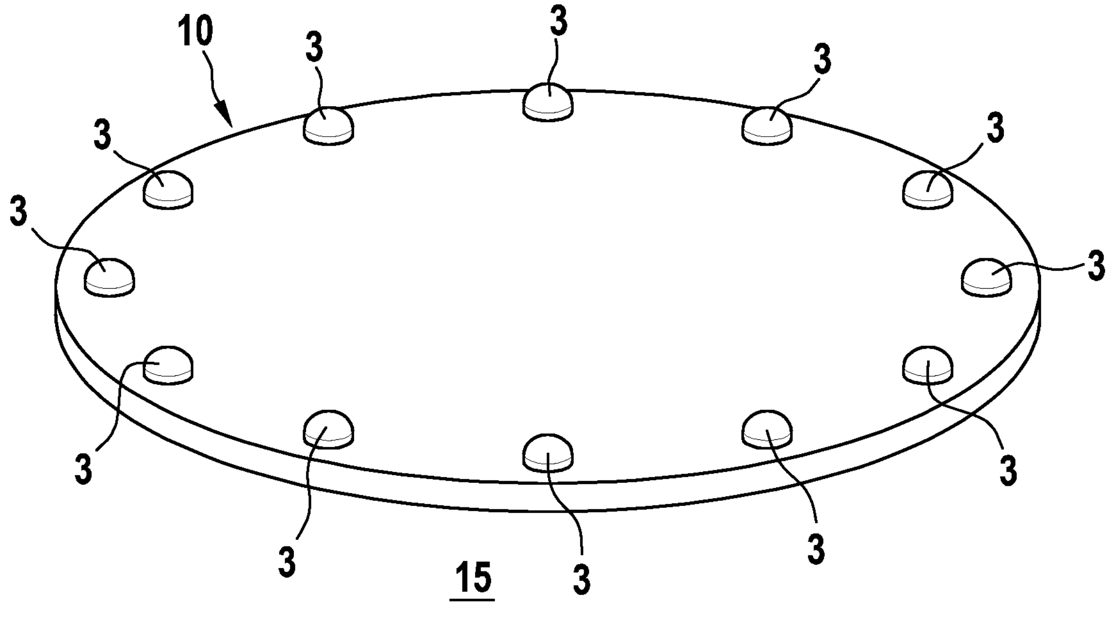
Figure 3:
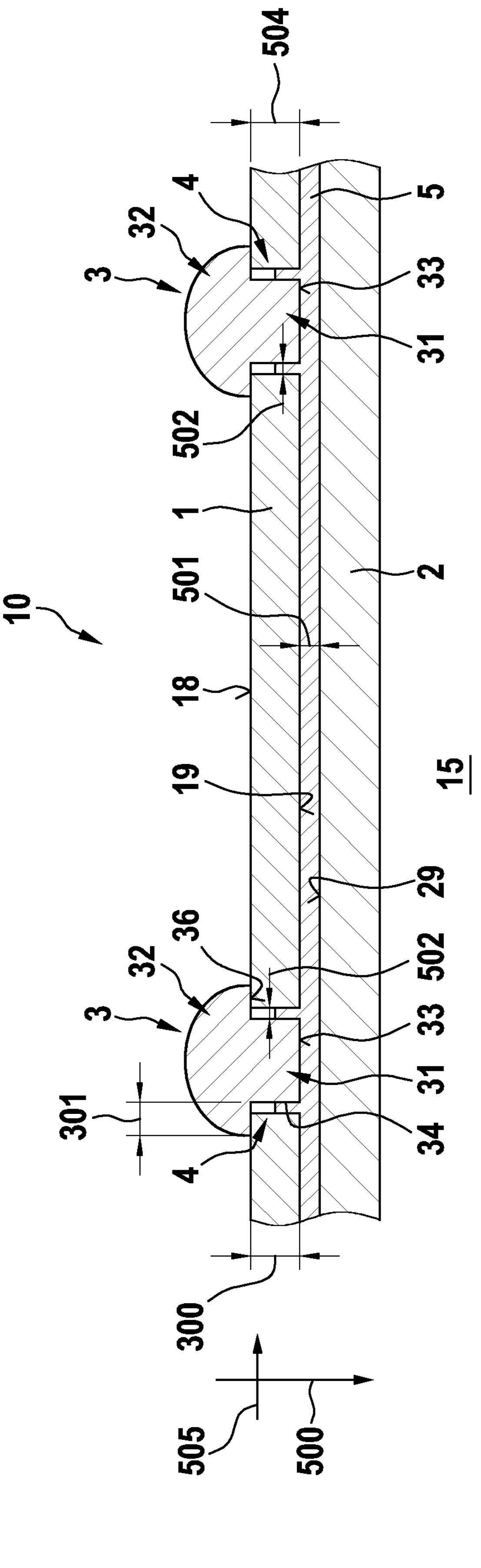
Figure 4:
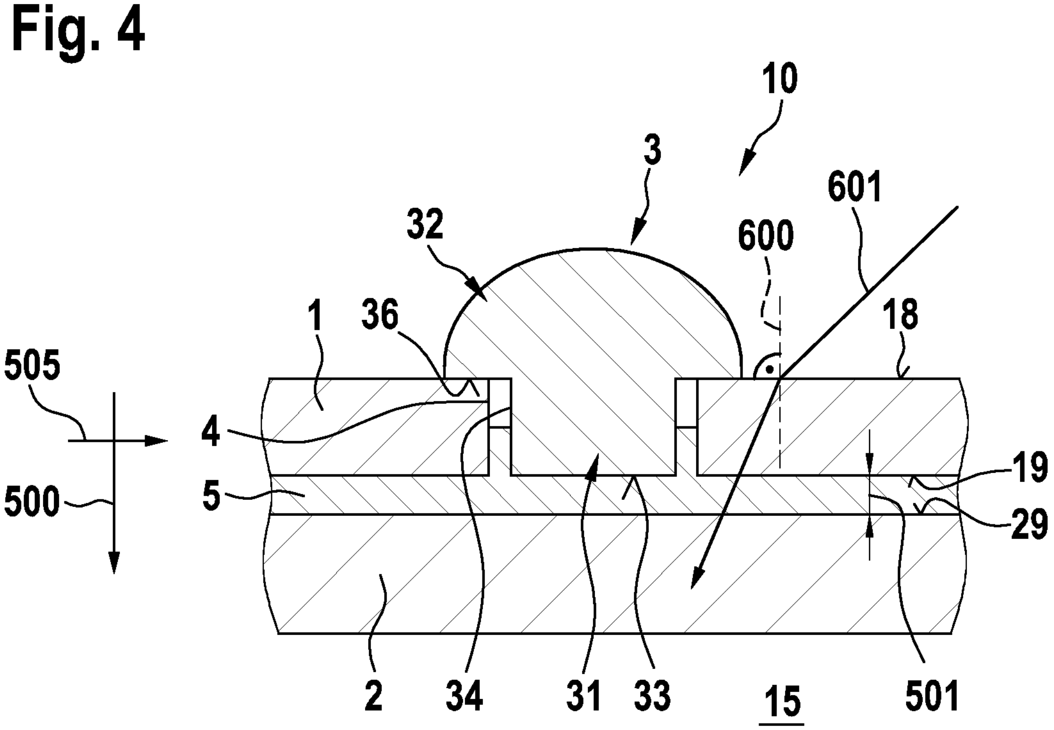
Figure 5:
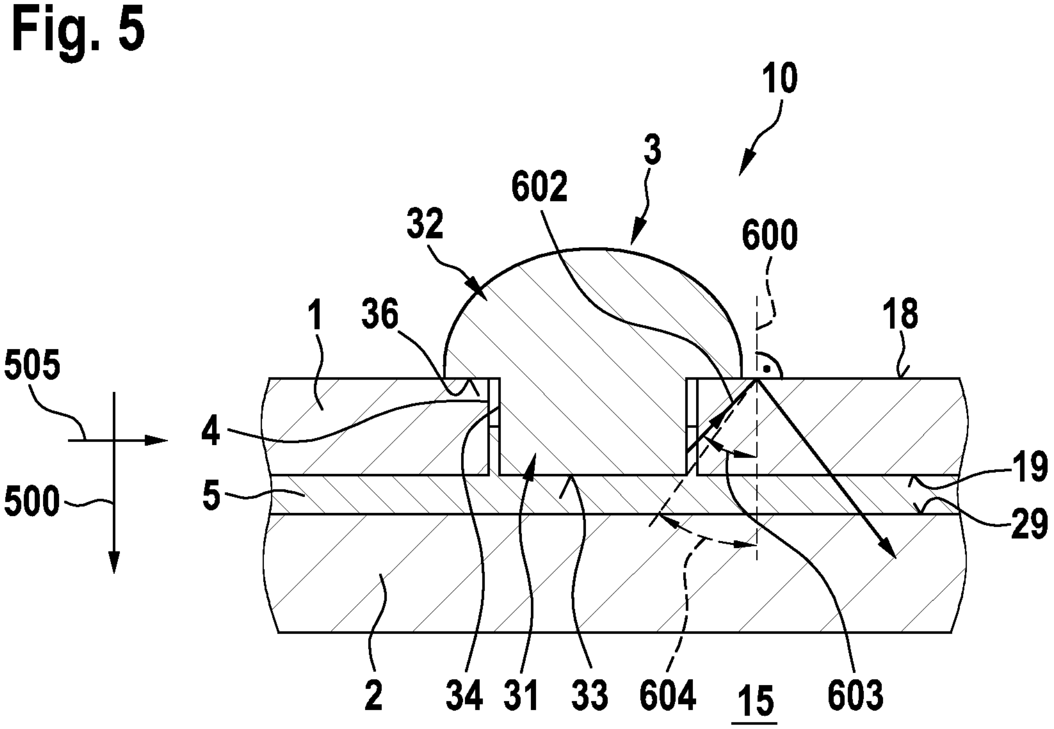
Figure 6:
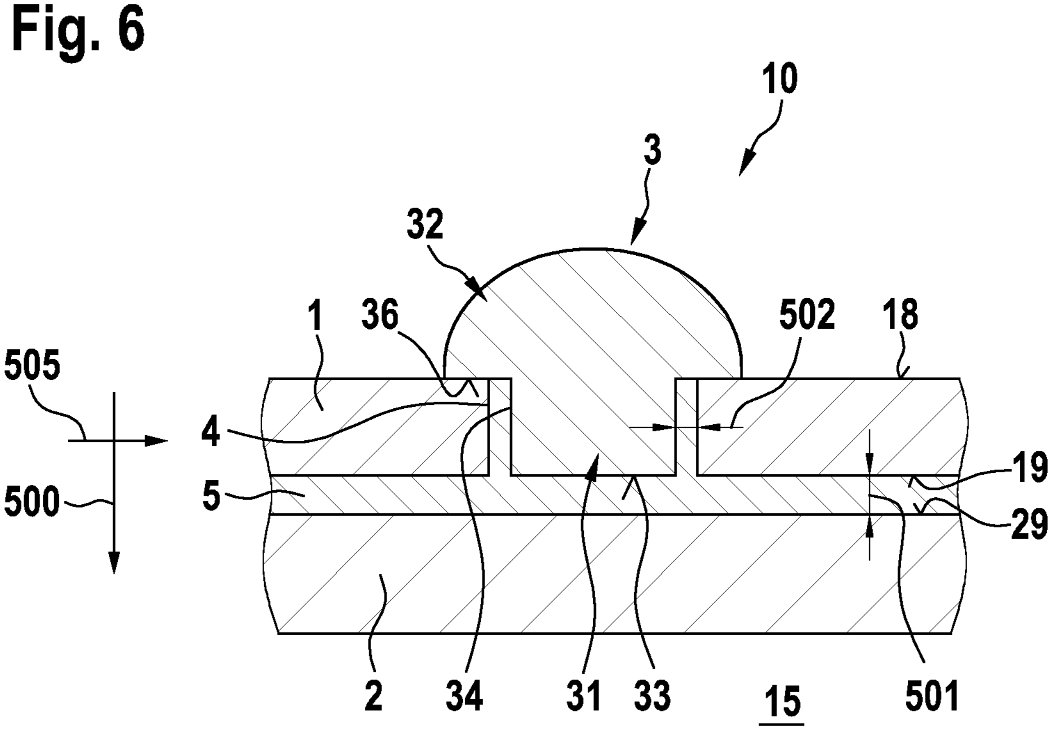
Figure 7:
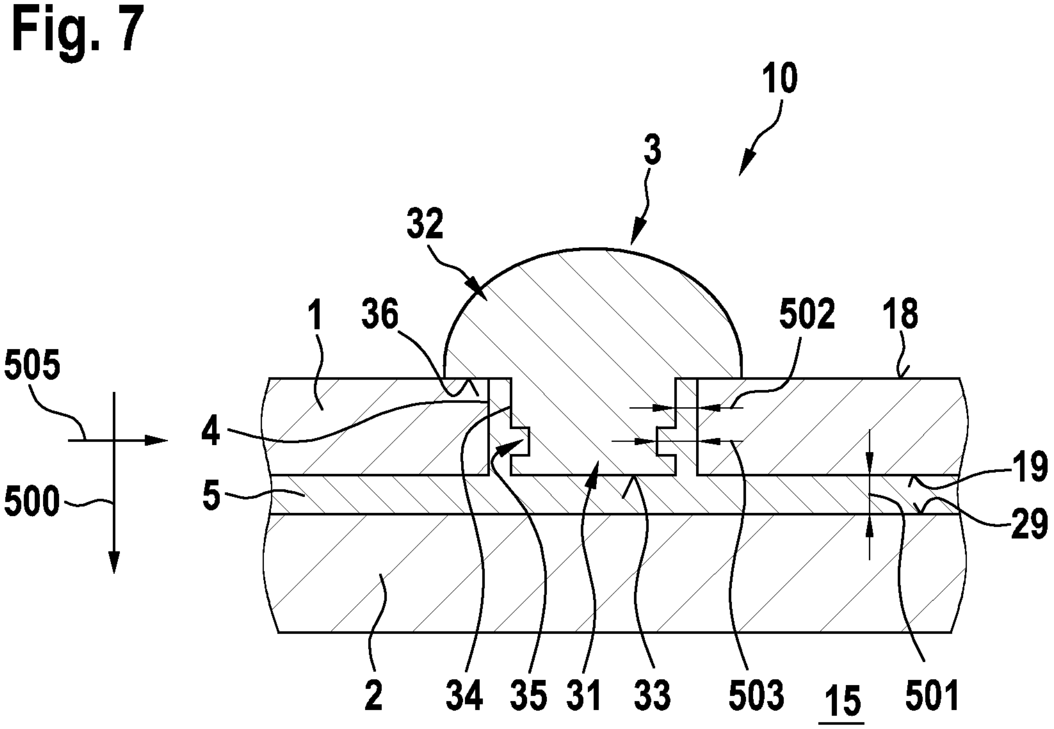
Figure 8:
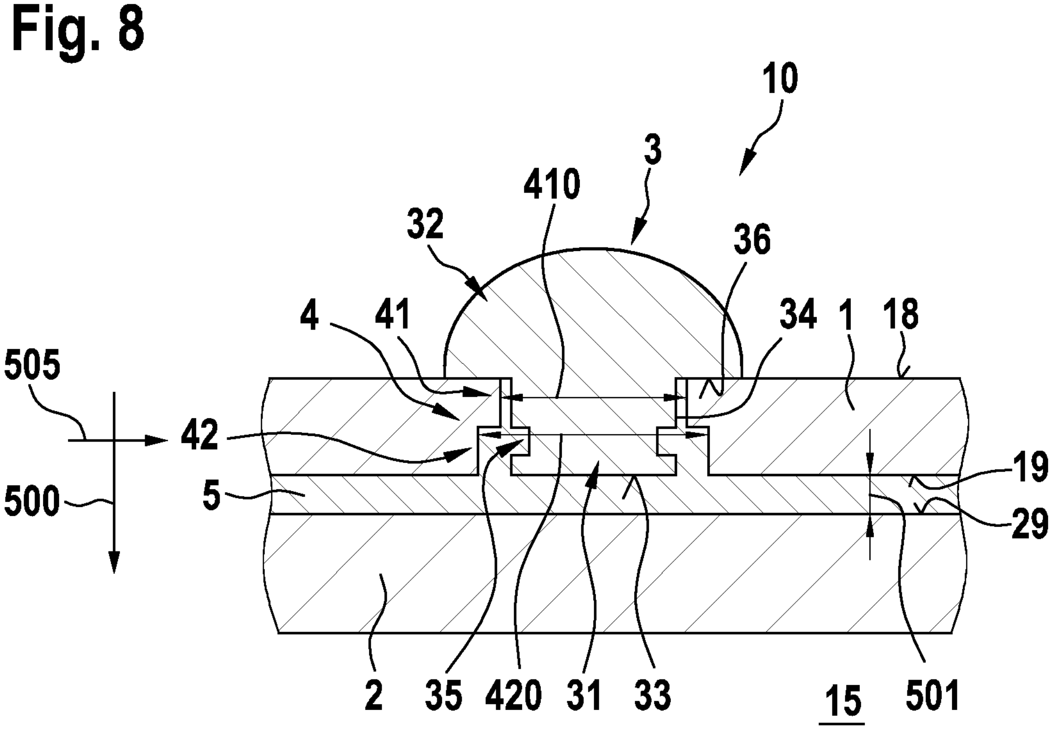
Figure 9:
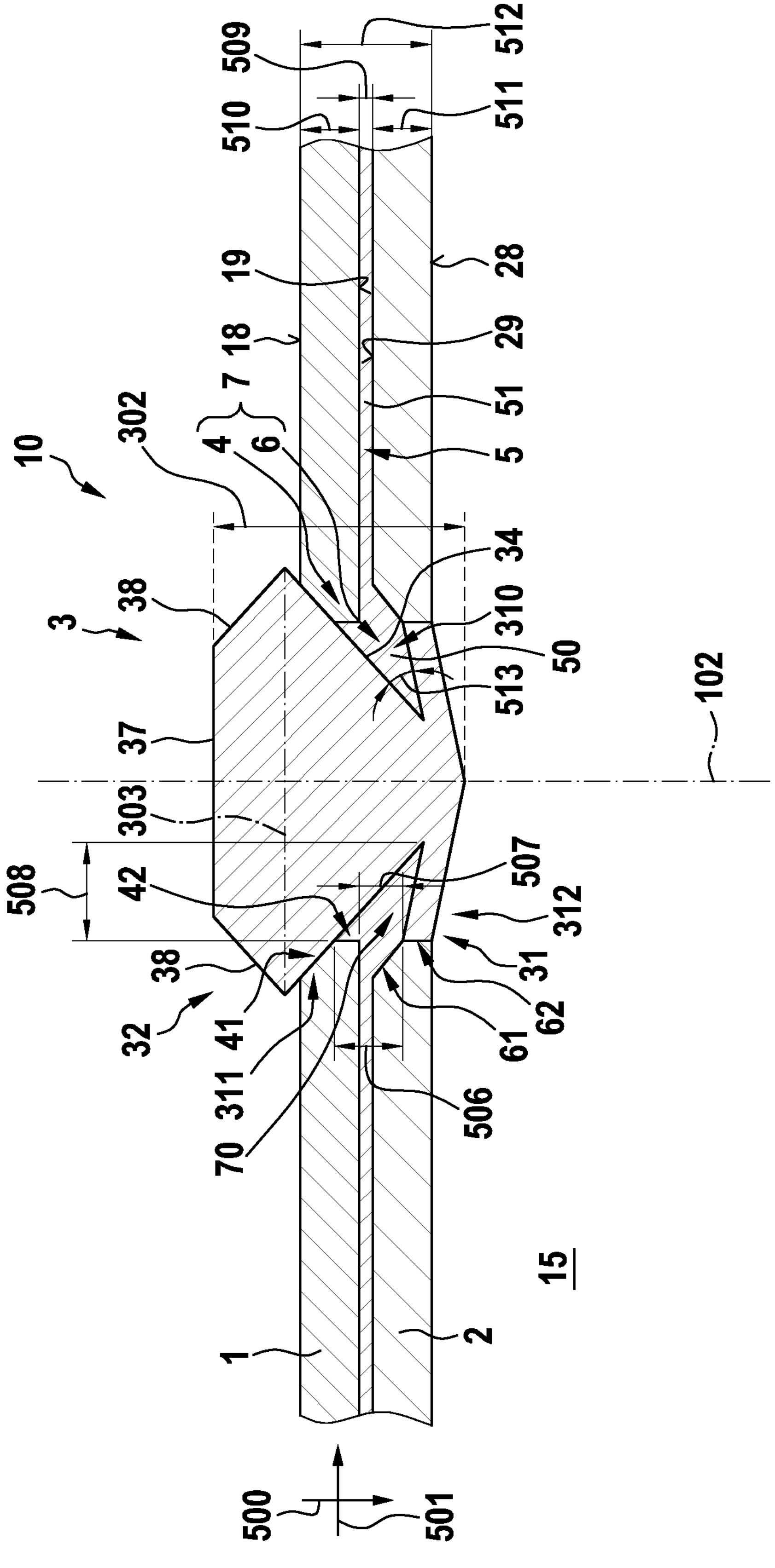

FIG. 1 shows a schematic top view of a watch according to the invention, which has a watch glass according to a first embodiment of the present invention, FIG. 2 shows a schematic perspective view of the watch glass of FIG. 1, FIG. 3 shows a schematic sectional view of the watch glass according to the section A-A indicated in FIG. 1, FIG. 4 shows a schematic sectional view of a part of the watch glass according to section A-A, FIG. 5 shows a further schematic sectional view of a part of the watch glass according to section A-A, FIG. 6 shows a schematic sectional view of a part of a watch glass according to a second exemplary embodiment of the present invention, FIG. 7 shows a schematic sectional view of a part of a watch glass according to a third exemplary embodiment of the present invention, FIG. 8 shows a schematic sectional view of a part of a watch glass according to a fourth embodiment of the present invention, and FIG. 9 shows a schematic sectional view of a part of a watch glass according to a fifth embodiment of the present invention.

In the following, a watch 100 with a watch glass 10 according to a first exemplary embodiment of the present invention is described in detail with reference to FIGS. 1 to 5.

As can be seen from FIG. 1, the watch 100 has a housing 11, in which the watch glass 10 is arranged. In particular, the watch glass 10 is glued to the housing 11 over its circumference. The housing 11 and the watch glass 10 are formed circularly, but can have any other shape such as of a rectangle, a polygon, etc.

According to FIGS. 1 and 2, twelve decorative elements 3 are provided in the watch glass 10 in the circumferential direction with the same distance from one another. The position as well as the number of the decorative elements 3 can, however, be chosen arbitrarily depending on the watch design. For example, it is also possible to provide the watch glass 10 with only one decorative element 3 or two or four decorative elements 3. The watch 100 also has furthermore a dial 12, which is formed, for example, as a gold plate, three hands 13 for displaying the hours, minutes and seconds and two connectors for connecting the housing 11 to a wristband 14.

In this exemplary embodiment, the decorative elements are 3 gemstones with a cabochon cut. Gemstones with other types of cuts as well as other types of decorative elements such as e.g. metal inlays can however also be used as the decorative elements 3 of the present invention.

FIG. 3 shows a sectional view of the watch glass 10 along section A-A in FIG. 1.

It arises therefrom that the watch glass 10 has a first glass 1 and a second glass 2, which are formed in particular as flat glass plates. However, it is also possible to form the glasses 1, 2 to be curved with the same curvature on their contact surfaces.

The first glass 1 and the second glass 2 lie on top of one another and are flatly connected to one another via a connecting intermediate layer 5. Owing to the material connection by means of the intermediate layer 5, an air-tight and water-tight junction between the glasses 1, 2 is formed.

The first glass 1 faces away from an interior 15 of the housing 11 and the second glass 2 faces the interior 15 of the housing 12 respectively. Thus, the first glass 1 is the glass that the light hits first. Within the context of the invention, the first glass 1 can also be referred to as upper glass or outer glass and the second glass as lower glass or inner glass.

In an advantageous manner, the first glass 1 is made from sapphire glass, which has a high scratch resistance. The second glass 2 is formed from mineral glass. Other materials, such as other types of glass or plastic, are, however, also possible for both the first glass 1 and the second glass 2.

For each decorative element 3, a continuous recess 4 is formed in the first glass 1. All the recesses 4 of the first glass 1 as well as all the decorative elements 3 are advantageously formed the same, respectively. Therefore, in the following description, reference is made only to a decorative element 3 and the recess 4 of the first glass 1 attributed thereto.

In contrast to the first glass 1, the second glass 2 is formed continuously. That is, the second glass 2 has no recess.

The decorative element 3, which is formed in one piece, has a base region 31 and an additional region 32. The base region 31 is arranged settingless in the continuous recess 4 of the first glass 1 and is in direct contact with the connecting intermediate layer 5. "Settingless" means that no setting for receiving and holding the decorative element is provided in the watch glass 10 or rather in the recess 4 of the first glass 1. Rather, the decorative element 3 is held in the recess 4 by the contact of the base region 31 with the connecting intermediate layer 5.

In particular, an end face 33 of the base region 31 is completely in direct contact with the connecting intermediate layer 5. The end face 33 of the base region 31 is the face of the decorative element 3 that faces the second glass 2 and is perpendicular to a thickness direction 500 of the glasses 1, 2.

It can be seen from FIGS. 3 to 5 that, in addition to the end face 33, also a circumferential surface 34 of the base region 31 is partially in direct contact with the connecting intermediate layer 5. In other words, the end face 33 of the base region 31 of the decorative element 3 is embedded in the connecting intermediate layer 5.

This means that the connecting intermediate layer 5 comprises both connecting material, which is located between opposite surfaces 19, 29 of the first glass 1 and the second glass 2, and connecting material, which is located between the circumferential surface 34 of the base region 31 of the decorative element 3 and the first glass 1 or rather the recess 4 of the first glass 1.

The end face 33 and the part of the circumferential surface 34 of the decorative element 3, which is in direct contact with the connecting intermediate layer 5, are within the context of the invention also referred to as holding areas, since, due to their contact with the connecting intermediate layer 5, the decorative element 3 is held in the watch glass 10.

In an advantageous manner, the connecting intermediate layer 5 is formed from a transparent laminating film (composite film).

As can be seen from FIG. 3, the connecting intermediate layer 5 has a first thickness 501 at every point between the opposite surfaces 19, 29 of the glasses 1, 2, in particular at the end face 33 of the decorative element 3, according to the defined values from the general part of the description. At the circumferential surface 34 of the base region 31 of the decorative element 3, the connecting intermediate layer 5 has a second thickness 502 that is smaller than the first thickness 501. In particular, the second thickness 502 of the connecting intermediate layer 5 between the circumferential surface 34 of the base region 31 of the decorative element 3 and the recess 4 of the first glass 1 or the first glass 1 perpendicular to the thickness direction 500 of the glasses 1, 2 preferably is between 0.1 mm (inclusive) and 0.6 mm (inclusive), in particular between 0.2 mm (inclusive) and 0.5 mm (inclusive).

The recess 4 has the same cross-sectional shape and cross-sectional area over its entire length. In particular, the recess 4 is formed in the shape of a cylinder. The length of the recess 4 corresponds due to the continuous design of the recess 4 to the thickness 504 of the first glass 1. Accordingly, the base region 31 of the decorative element 3 is formed in the shape of a cylinder. Thus, the connecting intermediate layer 5 at the part of the circumferential surface 34 of the base region 31 that is in direct contact with the intermediate layer 5 is formed in the shape of a hollow cylinder.

The complete base region 31 of the decorative element 3 is arranged only in the recess 4 of the first glass 1.

In particular, the base region 31 of the decorative element 3 is arranged flush with the surface 19 of the first glass 1 facing the second glass 2 (also: lower surface). Alternatively, the base region 31 of the decorative element 3 may end in the recess 4, i.e. have a length that is smaller than the depth of the recess 4.

The additional region 32 of the decorative element 3 protrudes beyond the first glass 1 in the thickness direction 500 of the glasses 1, 2 and in each direction 505 perpendicular to the thickness direction 500. In other words, the additional region 32 projects completely circumferentially, i.e. over 360 degrees, beyond the recess 4. Thus, the additional region 32 is located above the first glass 1. In particular, the additional region 32 lies on the first glass 1. There is preferably no material connection between the additional region 32 and the first glass 1.

Preferably, a cross-sectional area of the additional region 32 of the decorative element 3 at the recess 4, i.e. the area of the lower surface 36 of the additional region 32, is preferably larger than a cross-sectional area of the recess 4 on the plane of the upper surface 18 of the first glass 1.

As already described, the decorative element 3 is in this exemplary embodiment a gemstone with a cabochon cut. Here, the additional region 32 corresponds to that area of the gemstone that is cut in the cabochon cut.

In particular, the decorative element 3 is formed in such a way that a ratio of the length 300 of the base region 31 of the decorative element 3 in the thickness direction 500 of the glasses 1, 2 to a length 301 of an overhang of the additional region 32 in each direction 505 perpendicular to the thickness direction 500 is maximally "two to one". In particular, the overhang is the part of the additional region 32 that protrudes beyond the base region 31. In an advantageous manner, the length 301 of the overhang is measured at the location of the recess 4, i.e. on the plane of the lower surface 36 of the additional region 32. In the decorative element 3, the length 301 of the overhang is maximum at this point.

Since due to this ratio the base region 31 is not very long, the base region 31 is on one hand covered by the additional region 32. On the other hand, this ratio has the effect that the base region 31 disappears optically and is therefore no longer realised by a viewer. This is explained in more detail with reference to FIGS. 4 and 5.

In FIG. 4, a light beam 601 that hits the first glass 1 at an angle is shown. Due to the different optical densities of air and the first glass 1, the light beam 601 is refracted at the upper surface 18 of the first glass 1. In particular, due to the greater optical density of the first glass 1 compared to air, is refracted towards the perpendicular 600. Since the base region 31 is not too long, the refracted light beam 601 does not reach the base region 31, but rather passes through the connecting intermediate layer 5 and the second glass 2. The fact that the first glass 1 is made of sapphire glass, which has a relatively high optical density or rather a relatively high refractive index (of approx. 1.77), what leads to a relatively strong refraction of the light beam 601 towards the perpendicular 600, contributes thereto.

It is, however, possible, depending on the angle of incidence of the light beams on the first glass 1, that a part of the light beams reach the base region 31 of the decorative element 3 and are reflected outward by this. Such a light beam 602 reflected outwards by the base region 31 is drawn in FIG. 5. Due to the described design of the additional region 32 in relation to the base region 31, the reflected light beam 602 is reflected at an angle 603, which is greater than the total reflection angle 604 of the first glass 1. Thus, the light beam 602 is totally reflected at the inner surface of the upper surface 18 of the first glass 1 and passes through the connecting intermediate layer 5 and the second glass 2. This results in that light, which hits the base region 31 and is reflected at it, does not fall into the eye of the viewer.

Thus, the base region 31 remains invisible and at the same time provides for a stable arrangement of the decorative element, in particular its additional region 32.

For manufacturing the watch glass 10, the first glass 1 and the second glass 2 are initially provided. In particular, the continuous recesses 4 are formed in the first glass 1. For this purpose, a laser process or a mechanical drilling process can be used.

After the shaping of the recesses 4, the upper surface 18 and lower surface 19 of the first glass 1 are ground in order to remove potential breakouts in the first glass 1 caused by the shaping of the recesses 4.

For connecting the glasses 1, 2, a starting intermediate layer, in particular a laminating film, is placed on the second glass 2.

The decorative elements 3 are placed in the corresponding recesses 4 of the first glass 1 and the first glass 1 is arranged on the second glass 2.

Subsequently, air is removed from the intermediate area between the first glass 1 and the second glass 2. This is done by building up a vacuum, which encompasses the entire arrangement of the first glass 1, the second glass 2, the starting intermediate layer that lies in between and the decorative elements 3. The vacuum is preferably maintained during the entire joining process (also: lamination process). The arrangement of the first glass 1, the second glass 2, the starting intermediate layer arranged in between and the decorative elements 3 is heated at a temperature between 110 degrees Celsius and 150 degrees Celsius, in particular between 130 degrees Celsius to 145 degrees Celsius, so that the starting intermediate layer becomes doughy or runny. Furthermore, a pressure of 1 bar is exerted on the arrangement, so that the first glass 1 is connected to the second glass 2 in the end. Thus, the material of the starting intermediate layer can easily get into a part of the space of the recess 4 between the first glass 1 and the base region 31. The capillary effect, which occurs because of the almost identical diameters of the cylindrical recess 4 and the cylindrical base region 31, also contributes to filling this space with material from the starting intermediate layer.

In an extended lamination process, in addition to the normal air pressure of 1 bar, which presses on the above-described arrangement, an additional pressure of up to 8 bar can preferably also be built up.

After the end of the described joining process, which takes place in particular in an autoclave, the connecting intermediate layer 5, which connects the first glass 1 to the second glass 2 in the finished watch glass 10 and provides for the stable arrangement of the decorative element 3 in the watch glass 10, is formed out of the starting intermediate layer. In particular, a partially, hollow-cylindrical casing of the base region 31 of the decorative element 3 made of connecting material of the intermediate layer 5 is thus formed.

By the casing of the base region 31 of the decorative element 3, the adhesive surface via which the decorative element 3 is held on the watch glass 10 increases many times over, and thus also the security of a long-lasting arrangement of the decorative element 3 on the watch glass 10.

What portion of the circumferential surface 34 of the base region 31 will be in direct contact with the connecting intermediate layer 5 in the finished watch glass 10 can in particular be controlled by the starting intermediate layer, in particular its thickness.

The present invention enables the attachment of the decorative elements 3 to a watch glass 10, in particular decorative elements 3 each with a base region 31 arranged in a recess 4 of the first glass 1 and an additional region 32 protruding beyond the recess 4 of the first glass 1, without the use of a setting. Thus, in the proposed watch glass 10, its appearance is determined only or basically by the decorative elements 3, wherein the breaking strength of the watch glass 10 and the stability of the connection between the decorative elements 3 and the first glass 1 is ensured.

In FIG. 6, a sectional view of a watch glass 10 according to a second exemplary embodiment of the present invention is shown.

The watch glass 10 according to the second exemplary embodiment differs from that according to the first exemplary embodiment basically in that in the watch glass 10 of the second exemplary embodiment the complete circumferential surface 34 of the base region 31 of the decorative element 3 is in direct contact with the connecting intermediate layer 5. Thus, in the the watch glass 10, a hollow cylindrical casing (also: hollow cylindrical region) made of connecting material is provided around the complete base region 31 of the decorative element 3. The hollow cylindrical casing is part of the connecting intermediate layer 5.

The formulation "complete circumferential surface" means that the base region 31 is in contact with the connecting intermediate layer 5 over its entire length and over 360 degrees.

Because of this, and because the additional region 32 lies on the upper surface 18 of the first glass 1, the lower surface 36 of the additional region 32 partially contacts the connecting intermediate layer 5.

Here, the end face 33 and the complete circumferential surface 34 of the base region 31 of the decorative element 3 serve as holding regions via which the decorative element 3 is attached to the watch glass 10.

FIG. 7 shows a sectional view of a watch glass 10 according to a third exemplary embodiment of the present invention.

The difference between the watch glass 10 according to the third exemplary embodiment and the watch glass 10 of the second exemplary embodiment is that the base region 31 of the decorative element 3 of the third exemplary embodiment has a completely circumferential recess 35 in its circumferential surface 34.

The recess 35, which is formed ring-shaped, is in direct contact with the connecting intermediate layer 5. That is, the recess 35 is filled with connecting material of the connecting intermediate layer 5. The base region 31 of the decorative element 3 is thus anchored in the recess 4 by means of the connecting intermediate layer 5. In other words, the connecting material in the recess 35 serves as an undercut of the connecting intermediate layer 5, by which it is even more prevented that the decorative element 3 is removed from the recess 4.

The connecting intermediate layer 5 has a first thickness 501 between the first glass 1 and the second glass 2 and a second thickness 502 between the first glass 1 and the base region 31 over its entire length up to the point of the recess 35 where the connecting Intermediate layer 5 has a third thickness 503. The third thickness 503 is larger than the second thickness 502. The values indicated in the general part of the description for the thickness of the connecting intermediate layer 5 between the first glass 1 and the base region 31 apply in particular also to the first thickness 501 and/or the second thickness 502 and/or the third thickness 503.

Due to the recess 35, an even more stable connection between the decorative element 3 and the first glass 1 is achieved.

In FIG. 8, a section of a watch glass 10 according to a fourth exemplary embodiment is shown. The watch glass 10 according to the fourth exemplary embodiment has a stepped recess 4.

In particular, the recess 4 comprises a first recess area 41 with a first cross-sectional region 410 and a second recess region 42 with a second cross-sectional area 420.

The second recess region 42 is arranged closer to the second glass 2 than the first recess region 41, wherein the second cross-sectional area 420 is larger than the first cross-sectional area 410.

As far as the cross-sectional shapes of the recess regions 41, 42 are concerned, the first recess region 41 and the second recess region 42 have the same cross-sectional shapes. In particular, both recess regions 41, 42 are cylindrical.

As in the case of the watch glass 10 of the third exemplary embodiment, the base region 31 of the decorative element 3 also in the case of the watch glass 10 according to the fourth exemplary embodiment has a completely circumferential recess 35 in its circumferential surface 34.

The recess 35 is arranged opposite the second recess region 42 and is connected to the second recess region 42 via the connecting intermediate layer 5. Here, a space between the second recess region 42 and the base area 31 of the decorative element 3, including the recess 35, is filled with connecting material of the connecting intermediate layer 5.

Thus, a particularly strong connection of the base region 31 of the decorative element 3 to the first glass 1 is achieved. Since the recess 35 is formed at the lower end, i.e. at the end of the base region 31 of the decorative element 3 facing the second glass, and the second recess region 42 with the second cross-sectional area 420, which is enlarged compared to the first recess region 41, is located closer to the second glass 2, the base region 31 can also withstand a torque caused by the impact of the additional region 32.

In this exemplary embodiment, the first recess region 41 is not in contact with the connecting intermediate layer 5. In other words, there is no connecting material of the connecting intermediate layer 5 in the space between the first recess region 41 and the circumferential surface 34 of the base region 31. However, a design in which the connecting material of the connecting intermediate layer 5 is provided in the space between the first recess region 41 and the circumferential surface 34 of the base region 31 is also possible.

FIG. 9 shows a sectional view of a watch glass 10 according to a fifth exemplary embodiment of the present invention, which can be inserted into the watch 100 of FIG. 1.

As can be seen from FIG. 9, the watch glass 10 comprises here also a first glass 1 and a second glass 2, which are connected to one another via a connecting intermediate layer 5.

Here, the first glass 1 has a continuous recess 4, wherein the second glass 2 also has a continuous recess 6. The continuous recess 4 of the first glass 1 and the continuous recess 6 of the second glass 2 together form a watch glass recess 7. The recess 4 of the first glass 1 can also be referred to as first recess 4 and the recess 6 of the second glass 2 as second recess 6.

Furthermore, the watch glass 10 comprises a decorative element 3 designed as a gemstone, which has a base region 31 and an additional region 32.

The base region 31 is arranged settingless in the watch glass recess 7. In other words, the base region 31 is arranged without a setting both in the first recess 4 and in the second recess 6.

In addition, in this exemplary embodiment, the base region 31 further protrudes beyond a lower surface 28 of the second glass 2. However, it is also possible that the base region 31 is completely received in the watch glass recess 7.

The additional region 32 protrudes beyond the upper surface 18 of the first glass 1. In other words, the additional region 32 is the region of the decorative element 3, which is located above the upper surface 18 of the first glass 1.

In particular, the additional region 32 extends in the thickness direction 500 of the glasses 1, 2 and in the direction 505 perpendicular to the thickness direction, in particular in each direction 505 perpendicular to the thickness direction.

In this exemplary embodiment, the additional region 32 of the decorative element 3 comprises a table 37, crown facets 38 and parts of pavilion facets 39 of the gemstone. Here, the table 37, the crown facets 38 and the parts of the pavilion facets 39 of the decorative element 3 are in direct contact with air. Thus, light can directly hit the decorative element 3.

Other shapes for the decorative element 3 or other types of cuts for the gemstone are, however, also conceivable. Thus, the additional region 32 of the decorative element 3 can instead of the table 37 and the crown facets 38 have a region with a cabochon cut or be formed as such. In particular, the additional region 32 can be formed as that region of the gemstone that is cut in the cabochon cut.

Furthermore, the decorative element 3 is formed in such a way that the base region 31 faces in comparison to the additional region 32 the housing 11 and the dial 12 of the watch 100. Accordingly, the additional region 32 faces in comparison to the base region 31 away from the interior 15 and the dial 12.

The base region 31 has, in particular, a first sub-region 311 and a second sub-region 312. The first sub-region 311 and the second sub-region 312 are each inclined to an axis 102 perpendicular to the glasses 1, 2. The axis 102 perpendicular to the glasses 1, 2 is parallel to the thickness direction 500 of the glasses 1, 2.

The second sub-region 312 has a greater inclination than the first sub-region 311. In other words, the second sub-region 312 is more inclined to the axis 102 perpendicular to the glasses 1, 2 than the first sub-region 311.

In particular, an angle 513 between the first sub-region 311 and the second sub-region 312 is less than 90 degrees, preferably between 10 degrees and 50 degrees, particularly preferably between 20 degrees and 40 degrees.

In particular, the first sub-region 311 and the second sub-region 312 are conically shaped. Other shapes for the first sub-region 311 and/or the second sub-region 312 are, however, also possible.

The base region 31, in particular its circumferential surface 34, is partially in direct contact with the connecting intermediate layer 5.

Here, a space 70 of the watch glass recess 7, which is defined by the first glass 1, the second glass 2 and the base region 3, in particular its first sub-region 311 and its second sub-region 312, is completely filled with connecting material 50 of the connecting intermediate layer 5, so that the decorative element 3 is connected to the first glass 1 and the second glass 2 via the connecting material 50.

Here, the connecting intermediate layer 5 advantageously comprises both connecting material 51, which is located between the opposite surfaces 19, 29 of the glasses 1, 2, and connecting material 50, which is located in the space 70 of the watch glass recess 7 between the first glass 1, the second glass 2, the first sub-region 311 and the second sub-region 312. In other words, the connecting material 50 in the space 70 forms together with the connecting material 51 between the opposing surfaces 19, 29 of the glasses 1, 2 the connecting intermediate layer 5. The connecting intermediate layer 5 is formed continuously between the space 70 and the space between the opposing surfaces 19, 29.

Thus, the connecting intermediate layer 5 serves to connect the first glass 1 to the second glass 2 and the decorative element 3 to both glasses 1, 2.

The first sub-region 311 and the second sub-region 32 define an intermediate space 310, which, in the mounted state of the decorative element 3 in the watch glass 10, is filled with the connecting material 50 of the connecting intermediate layer 5. The intermediate space 310 can also be referred to as a recess in the decorative element 3. In particular, in the mounted state of the decorative element 3 in the watch glass 10, the space 310 coincides with the space 70 of the watch glass recess 7.

It can also be seen from FIG. 9 that a maximum thickness 507 of the connecting intermediate layer 5 between the first glass 1 and the second glass 2 in the thickness direction 500 of the glasses 1, 2 is less than a maximum thickness 506 of the connecting material 50 of the connecting intermediate layer 5 in the space 70 between the first glass 1, the second glass 2, the first sub-area 311 and the second sub-area 312 in the thickness direction 500 of the glasses 1, 2.

Furthermore, the maximum thickness 507 of the connecting intermediate layer 5 between the first glass 1 and the second glass 2 in the thickness direction 500 of the glasses 1, 2 is smaller than a maximum thickness 508 of the connecting material 50 of the connecting intermediate layer 5 in the space 70 between the first glass 1, the second glass 2, the first sub-region 311 and the second sub-region 312 in a direction 505 perpendicular to the thickness direction 500 of the glasses 1, 2.

For example, the maximum thickness 507 can be up to 0.4 mm, preferably up to 0.5 mm. The maximum thickness 508 may for example amount to 2 mm.

Furthermore, the connecting material 50 of the connecting intermediate layer 5 in the space 70 has a triangular cross-section on a section plane perpendicular to the upper surface 18 of the watch glass 10. Here, the section plane is defined by the thickness direction 500 of the glasses 1, 2 and a direction 505 perpendicular to the thickness direction 500.

In this exemplary embodiment, the second sub-region 312 of the decorative element 3 protrudes beyond the lower surface 28 of the second glass 2, in particular by a maximum of 20%, preferably a maximum of 10%, particularly preferably a maximum of 5%, of a thickness 512 of the watch glass 10. Here, the thickness 512 of the watch glass 10 corresponds to the sum of a thickness 510 of the first glass 1, a thickness 511 of the second glass 2 and a thickness 509 of the connecting intermediate layer 5 in the area between the first glass 1 and the second glass 2, wherein all thicknesses 509, 510 and 511 are measured at the same point.

However, it is also possible that the second sub-region 312 of the base region 31 ends in the watch glass recess 7, in particular in the second recess 6. Alternatively, an end region of the second sub-region 312 can be flush with the lower surface 28 of the second glass 2.

As can also be seen from FIG. 9, the first recess 4 has a first recess region 41 and a second recess region 42. The first recess region 41 has a larger cross-sectional area than the second recess region 42. In particular, the first recess region 41 is conically shaped, wherein the second recess region 42 is cylindrical.

Correspondingly, the second recess 6 has according to FIG. 9 a first recess region 61 and a second recess region 62. Here, the first recess region 61 has a larger cross-sectional area than the second recess region 62. In particular, the first recess region 61 is conically shaped, wherein the second recess region 62 is cylindrical.

Other shapes for the first recess 4 and/or the second recess 6, in particular for the recess regions 41, 42, 61, 62, are, however, also possible.

The first (conical) recess region 41 of the first recess 4 is arranged at the upper surface 18 of the first glass 1, wherein the first (conical) recess region 61 of the second recess 6 is arranged at the upper surface 29 of the second glass 2. Accordingly, the second (cylindrical) recess region 42 is arranged at the lower surface 19 of the first glass 1, wherein the second (cylindrical) recess region 62 is arranged at the lower surface 29 of the second glass 2.

In particular, the first recess region 41 of the first recess 4 extends over the upper half of the depth of the first recess 1, wherein the second recess region 42 of the first recess 4 extends over the lower half of the depth of the first recess 4. The same applies to the first recess region 61 and the second recess region 62 of the second recess 6.

For shaping the conical recess regions 41, 61, the first recess 4 and the second recess 6 are beveled at the upper surfaces 18, 28 of the glasses 1, 2 completely in the circumferential direction, i.e. over 360 degrees.

As can also be seen from FIG. 9, the first sub-region 311 of the base region 31 abuts on the first recess region 41 of the first recess 4 and has a conical shape at the contact point like the first recess region 41. In particular, the first sub-region 311 can be glued to the first recess region 41 of the first recess 4.

Furthermore, the second sub-region 312 of the base region 31 contacts the second recess region 62 of the second recess 6 and has a cylindrical shape at the contact point like the second recess region 62. In particular, the second sub-region 312 and the second recess region 62 of the second recess 6 are not glued to one another.

Thus, the space 70 of the watch glass recess 7 is defined in particular by the first recess region 41 of the first recess 4, the first sub-region 311, the second sub-region 312 and the second recess region 62 of the second recess 6.

As already described, the decorative element 3 protrudes beyond the upper surface 18 of the watch glass 10 and is partially arranged in the watch glass recess 4. In particular, the decorative element 3 has a dimension 302 parallel to the thickness direction 500 of the glasses 1, 2, which is over 100% of the thickness 512 of the watch glass 10.

The decorative element 3 can, however, have a dimension 302 parallel to the thickness direction 500 of the glasses 1, 2, which is smaller than the thickness 512 of the watch glass 10. Here, the decorative element 3 can be arranged in such a way that it still protrudes over the upper surface 18 of the watch glass 10.

Furthermore, the decorative element 3 has a maximum cross-sectional area 303 in the direction 505 perpendicular to the thickness direction 500. The maximum cross-sectional area 303 can be at least 1/20, preferably at least 1/16, particularly preferably at least 1/10, of the area of the upper surface 18 of the first glass 1. In an advantageous manner, the cross section of the decorative element 3 with the maximum cross-sectional area 303 is located above the first glass 1, that is, in the additional region 32 of the decorative element 3. Thus, the decorative element 3 can in particular appear as floating.

For providing the decorative element 3 designed as a gemstone, a raw gemstone is cut in such a way that the base region 31 with the first sub-region 311 and the second sub-region 312 and the additional region 32 are formed in the decorative element 3. Due to the described shape of the decorative element 3 and its settingless arrangement in the watch glass recess 7, the decorative element 3 appears to be floatingly arranged. Furthermore, the connecting material 50 in the space 70 of the watch glass recess 7 represents an undercut of the connecting intermediate layer 5, which, in addition to the connecting properties of the connecting material 50, makes sure that the decorative element 3 cannot be removed from the watch glass recess 7.

In addition to the above written description of the invention, reference is hereby explicitly made to the diagrammatic illustration of the invention in FIGS. 1 to 9 for additional disclosure thereof.

LIST OF REFERENCE SIGNS

1 first glass
2 second glass
3 decorative element
4 recess
5 intermediate layer
6 recess
7 watch glass recess
10 watch glass
11 housing
12 dial
13 hand
14 connector for a wristband
15 interior
18 upper surface
19 surface
28 lower surface
29 surface
31 base region
32 additional region
33 end face
34 circumferential surface
35 recess
36 lower surface
37 table
38 crown facet
41 first recess region
42 second recess region
50 connecting material
51 connecting material
61 first recess region
62 second recess region
70 space
100 watch
102 axis
300 length
301 length
302 dimension
303 cross-sectional area
310 intermediate space
311 first sub-region
312 second sub-region
410 first cross-sectional area
420 second cross-sectional area
500 thickness direction
501 first thickness
502 second thickness
503 third thickness
504 thickness
505 direction perpendicular to the thickness direction
506 thickness
507 thickness
508 thickness
509 thickness
510 thickness
511 thickness
512 thickness
513 angle
600 perpendicular
601 light beam
602 light beam
603 angle
604 total reflection angle

The invention claimed is:

1. A watch glass, comprising:
a first glass,
a second glass, and
a decorative element that is a gemstone,
wherein the first glass and the second glass are connected to one another via a connecting intermediate layer,
wherein the first glass comprises a continuous recess,
wherein the decorative element comprises a base region, which is arranged in the recess settingless and in direct contact with the connecting intermediate layer,
wherein the decorative element comprises an additional region, which extends beyond the first glass, and
wherein a ratio of a length of the base region of the decorative element in the thickness direction of the glasses to a length of an overhang of the additional region in the direction perpendicular to the thickness direction is selected such that reflectable light from the base region is totally reflectable at an inner surface of an upper surface of the first glass, and/or that at least a part of the light which enters the first glass does not reach the base region.

2. The watch glass according to claim 1, wherein an end face of the base region and/or a circumferential surface of the base region of the decorative element is/are at least partially in direct contact with the connecting intermediate layer.

3. The watch glass according to claim 1, wherein the base region of the decorative element is completely arranged in the recess of the first glass.

4. The watch glass according to claim 1, wherein the base region is formed in the shape of a pin.

5. The watch glass according to claim 1, wherein the base region is arranged flush with a surface of the first glass facing the second glass or wherein the base region ends in the recess of the first glass.

6. The watch glass according to claim 1, wherein the base region of the decorative element has a circumferential recess in the circumferential surface of the base region.

7. The watch glass according to claim 1, wherein the additional region is arranged on the first glass.

8. The watch glass according to claim 1, wherein the ratio is maximally "2:1".

9. The watch glass according to claim 1, wherein the second glass comprises a recess, which forms together with the continuous recess of the first glass a watch glass recess, wherein the decorative element is arranged in the watch glass recess and a space of the watch glass recess, which is defined by the first glass, the second glass and a decorative element, is filled with connecting material of the connecting intermediate layer, so that the decorative element is connected via the connecting material with the first glass and the second glass.

10. The watch glass according to claim 9, wherein the basis region comprises a first sub-region and a second sub-region, wherein the space of the watch glass recess is defined by the first glass, the second glass, the first sub-region and the second sub-region, wherein the first sub-region and/or the second sub-region is/are inclined to an axis being vertical to the glasses.

11. A watch, comprising the watch glass according to claim 1.

12. The watch glass according to claim 1, wherein the recess of the first glass has the same cross-section over its entire length.

13. The watch glass according to claim 1, wherein the recess of the first glass has a first recess region with a first cross-sectional area and a second recess region with a second cross-sectional area, wherein the second cross-sectional area is larger than the first cross-sectional area and the second recess region is arranged closer to the second glass than the first recess region.

14. The watch glass according to claim 13, wherein the recess of the base region of the decorative element is arranged opposite the second recess region and is connected to the second recess region via the connecting intermediate layer.

* * * * *